3,272,788
COMBINATION SLURRY-SOLUTION POLYMERIZATION PROCESS
Richard E. Dietz, Bartlesville, Okla., assignor to Phillips Petroleum Company, a corporation of Delaware
No Drawing. Filed Aug. 23, 1962, Ser. No. 218,843
5 Claims. (Cl. 260—93.7)

This invention relates to a combination slurry-solution polymerization process in which a second monomer is polymerized in solution in the presence of a slurry of a polymer of a first monomer, the catalyst used for the polymerization of the first monomer being the only catalyst present during the second polymerization step.

The polymerization of 1-olefins in the presence of heterogeneous catalyst systems is well known and numerous procedures have been disclosed in the art for effecting these polymerizations. Such procedures can be conducted as solution operations in which the polymer is recovered as a solution in a selected reaction diluent or as slurry operations in which the polymer is in the form of fine particles, insoluble in the reaction diluent at the polymerization temperature used. By whatever process the operation is carried out, it has been observed that substantial amounts of catalyst residues remain in the recovered polymer. For these operations the catalyst systems employed usually comprise a combination of an organometal, frequently an aluminum compound, and a salt of a heavy metal, frequently a titanium compound. In the recovery procedures conventionally employed, the organometal constituent of the catalyst is more or less completely removed in the reaction diluent and in subsequent washing of the polymer. However, the heavy metal constituent tends to become occluded in the polymer and is not easily removed. Such metal residues give rise to objectionable color development and other disadvantages in finishing and/or fabrication operations in which the polymer is used. Heretofore, laborious washing procedures involving the use of acids, bases, alcohols, and the like, or combinations of such materials have been employed to remove or inactivate such catalyst residues.

An object of this invention is to provide a polymerization process wherein a polymer product produced has lower catalyst residue therein than a similar polymer produced in the presence of the same catalyst but which has not been subjected to a catalyst residue removable step. A further object of the invention is to provide a polymerization process in which an olefin polymer is produced which has a sufficiently low catalyst residue content that additional catalyst residue removal steps are unnecessary.

The invention involves first the slurry polymerization of an auxiliary monomer in the system, said monomer being one which forms a polymer insoluble under the conditions employed for polymerization of said principal monomer in the presence of the previously formed solid polymer of the auxiliary monomer.

In one embodiment of the invention a monomer such as propylene is polymerized in an inert diluent in the presence of a catalyst system comprising diethylaluminum chloride and titanium trichloride at a temperature of from 100 to 125° F. After an appreciable amount of solid polymer is formed, the unreacted propylene is vented and 1-butene charged to the system. The temperature is then raised to a level which may be the same as that used in the first step or different therefrom but in any case is below that at which the polymer of the auxiliary monomer (polypropylene) dissolves in the reaction diluent. When polymerization of the principal monomer (1-butene) has reached the desired point, the solid polymer of the auxiliary monomer is removed by filtration or decantation, and the polymer of the principal monomer recovered from the solution essentially free from titanium residues.

In another embodiment of the invention a monomer such as propylene is polymerized in a mass-type operation, the monomer itself acting as the diluent. The catalyst and the conditions used are similar to those described above. When an appreciable amount of solid polypropylene is formed, unreacted propylene is removed and an inert diluent charged along with the desired principal monomer, for example, 1-butene. The temperature is again established at a level at which 1-butene is polymerized to polymer which dissolves in the diluent but below that at which the polypropylene is dissolved. Separation and recovery steps are as previously described.

In the recovery steps it is frequently convenient to add, subsequent to the polymerization, a further amount of diluent in order to facilitate separation of the polymer solution from the solid polymer of the auxiliary monomer. Addition of this diluent is conveniently made prior to cooling of the system since at slightly elevated temperature homogeneous dilution of the polymer solution is more readily effected and at the same time, cool solvent tends to lower the temperature of the system more rapidly.

The solid polymer from the auxiliary monomer which contains fairly high concentrations of catalyst residues, while a minor byproduct of the process, is useful in a number of applications in which color development is not a drawback, e.g., for pipe, pigmented articles, and the like.

The process of the present invention is useful for the production of polymers of propylene, 1-butene, 1-pentene, 1-hexene, 1-octene, and the like, these materials being used as principal monomers.

he olefins used as auxiliary monomers include propylene and 3 - methyl-1-butene. When using propylene as the principal monomer, the auxiliary monomer used will be an olefin such as 3-methyl-1-butene. As previously pointed out, the auxiliary monomer will be an olefin which forms a polymer which is insoluble in the diluent used at the temperature of the solution polymerization of the principal monomer.

From the above discussion, it will be apparent that a large number of catalyst systems are available. These systems include the use of mixtures containing an organo-metallic reducing agent and a reducible compound of a heavy metal of Groups IV, V, VI and VIII. These systems have been extensively studied in recent years and there is a very considerable amount of literature thereon. The organometal compound is a compound of a metal of Groups I, II and III of the Periodic System and includes those in which one or more but not all of the organo groups are replaced by halogen. Examples of such compounds include triethylaluminum, diethylaluminum chloride, ethylaluminum dichloride, ethylmagnesium bromide, amylsodium, and butyllithium. The other component is a salt of a metal of Groups IV, V, VI and VIII. The trihalides of titanium are most generally used, although compounds of zirconium, hafnium and germanium have received considerable attention. Frequently a complex of the reducible metal halide is used, such as the complex obtained by reducing titanium tetrachloride with aluminum. This complex is generally represented by the formula $3TiCl_3 \cdot AlCl_3$.

The diluents employed are hydrocarbons liquid under the conditions of the reaction, such materials being paraffinic, naphthenic, or aromatic. Also, is some instances, in the first step of the reaction, the olefin itself may serve as the diluent, e.g., liquid propylene can serve as both auxiliary monomer and diluent in the first stage when using this monomer in an auxiliary capacity. The second step is limited to a solution type operation.

Temperatures will be governed by the particular monomer used in the two stages of the process and are limited otherwise to operating in the second stage in a manner that the first stage polymer remains solid and that of the second stage dissolves in the diluent, such differential situation being maintained throughout the second stage of the process and the polymer separation step. For example, 1-butene can be polymerized in solution at a temperature in the range of approximately 100 to 200° F. using propylene as the auxiliary monomer, polypropylene being insoluble in this range. Likewise propylene can be polymerized in solution in the range of approximately 230 to 400° F. using 3-methyl-1-butene as the auxiliary monomer, the polymer thereof being insoluble in this range.

The amount of auxiliary monomer polymerized in the first step will generally be sufficient to provide about 20 grams of solid polymer per gram of heavy metal salt in the catalyst. Larger amounts can be used if desired. Since the polymer from the auxiliary monomer is contaminated by catalyst residues, it is economically advantageous to maintain a fairly low level in the amount used.

No particular precautions are necessary between the first and second steps of the polymerization process beyond preventing contamination with materials which will function as catalyst poisons. Air and water should, of course, be excluded.

While I have referred to the first polymer formed as being insoluble in the solution polymerization step, the second step of my process, those skilled in the art will understand that a very small amount of the first polymer may be soluble in the solvent used for the second step. For instance, when polypropylene is produced with the catalyst systems of this invention, there is a small amount, generally less than 2 or 3 percent, of a low molecular weight amorphous product. This is soluble in the diluents used in the second step of the process.

The present invention can be carried out using a small amount of hydrogen during the polymerization in order to improve control over the molecular weight of the product and to produce other useful results. The use of hydrogen in such polymerization is not actually a part of the present invention. The amount of hydrogen, when so used, is usually approximately one-half mol percent based upon the monomer used.

*Example I*

Two runs were made for the polymerization of 1-butene, the first according to the process of the invention using propylene as the auxiliary monomer, the second as a control with no auxiliary monomer. Both runs were made in a 1-gallon stainless steel reactor.

For the first run, 0.726 gram of diethylaluminum chloride (solution in n-heptane) and 0.193 gram of titanium trichloride complex ($3TiCl_3 \cdot AlCl_3$) were charged as catalyst together with 2 liters of liquid propylene, the latter serving as the auxiliary monomer and reaction diluent. The temperature was elevated to 110° F. and maintained at this level for one hour after which the temperature was lowered and unreacted propylene vented, leaving pulverulent polyropylene in the reactor. To the system was then charged 2 liters of n-heptane and one liter of 1-butene. After 3 hours at 150° F. the reactor was cooled and the contents diluted with an additional amount of heptane. After standing overnight, the reaction mixture was decanted through an 80 mesh screen to remove solid polypropylene from the poly-1-butene solution. A portion of this solution was evaporated to recover a sample of the poly-1-butene. By analysis this polymer was found to contain 55 parts per million of titanium.

For the second run, the reactor was charged with 0.478 gram of diethylaluminum chloride (heptane solution); 0.222 gram titanium trichloride complex ($3TiCl_3 \cdot AlCl_3$) as catalyst, 2 liters of n-heptane as diluent, and 1 liter of 1-butene. The reactor was sealed and the temperature maintained at 150° F. for 3 hours after which it was cooled and the solution removed. A sample of the poly-1-butene recovered by evaporation of the diluent was found to contain 1350 p.p.m. of titanium.

This example shows that by the use of the auxiliary monomer, titanium content of the poly-1-butene was reduced by about 96 percent.

*Example II*

Another run was made in which there were charged to a 1-gallon reactor approximately 1.7 liters of n-heptane, 0.91 gram of diethylaluminum chloride (solution in n-heptane), 0.1 gram of $3TiCl_3 \cdot AlCl_3$, and 1 liter of propylene. The mixture was heated to 120° F. and maintained for 30 minutes. Excess propylene was vented and one liter of 1-butene was charged. The mixture was maintained at 160° F. for 3 hours. Excess butene was vented and the solution filtered to separate the solid polypropylene from the solution of polybutene. The polypropylene, in an amount of 3.5 grams, contained 2760 p.p.m. of titanium. After evaporating the polybutene solution to dryness, 6.5 grams of solid polybutene were recovered and this material found to contain 58 p.p.m. of titanium.

*Example III*

Substantially the process of Example II was followed except that the first mixture was maintained at 120° F. for 45 minutes and the propylene slurry heated to 160° prior to the addition of the 1-butene. The mixture was maintained at 160° F. for 3 hours after 1-butene addition. Using the same recovery process, 6.5 grams of polypropylene were obtained containing 675 p.p.m. of titanium and 3.5 grams of polybutene containing 38 p.p.m. of titanium.

As many possible embodiments can be made of this invention without departing from the scope thereof, it is to be understood that all matter herein set forth is to be interpreted as illustrative and not as unduly limiting the invention.

I claim:

1. In a solution polymerization process in which a 1-olefin, hereinafter designated a principal monomer, is polymerized in the presence of a catalyst comprising a mixture of a salt of a metal of Groups IV, V, VI and VIII and an organo compound of a metal of Groups I, II and III, the improvement comprising conducting, prior to the polymerization of said principal monomer, polymerization of an auxiliary monomer in the presence of the catalyst to be used for the polymerization of the principal monomer, said auxiliary monomer being a 1-olefin which forms a polymer which is insoluble in the diluent used at the temperature of the solution polymerization of the principal monomer, the polymerization of said auxiliary monomer being carried out at a temperature at which the polymer of the auxiliary monomer is insoluble in the diluent and the polymerization of said principal monomer being carried out at a temperature at which said polymer of said auxiliary monomer is insoluble and said polymer of said principal polymer is soluble in the diluent, and separating said insoluble polymer of said auxiliary monomer from the solution of said polymer of said principal monomer.

2. A polymerization process comprising polymerizing a first monomer in the presence of a catalyst comprising a mixture of a salt of a metal of Groups IV, V, VI and VIII and an organo compound of a metal of Groups I, II and III at a temperature at which solid polymer is formed, polymerizing a second monomer in the presence of the polymer of said first monomer, said second monomer being polymerized in the presence of a solvent for said second monomer and the polymer thereof, the polymerization of said second monomer being carried out at a temperature at which the polymer of said first monomer is insoluble in said solvent but said polymer of said second monomer is soluble, said first and second monomers being 1-olefins, and separating the insoluble polymer of said first monomer from the solution of the polymer of said second monomer.

3. A polymerization process comprising polymerizing propylene in the presence of a catalyst obtained by mixing diethylaluminum chloride and a titanium trichloride-aluminum trichloride complex at a temperature at which polypropylene formed is a solid, adding n-heptane and 1-butene, and polymerizing said 1-butene at a temperature at which the polypropylene previously formed is insoluble but the polybutene formed is soluble, separating solid polypropylene from the solution of polybutene thereby obtaining a solution of polybutene from which solid polybutene can be separated, said polybutene having a lower catalyst residue level than polybutene produced at the same catalyst level without the preliminary propylene polymerization, and separating said solid polypropylene from said solution of said polybutene.

4. A polymerization process comprising polymerizing propylene in n-heptane in the presence of a catalyst obtained by mixing diethylaluminum chloride and a titanium trichloride-aluminum trichloride complex at a temperature at which polypropylene formed is a solid, adding 1-butene, and polymerizing said 1-butene at a temperature at which the polypropylene previously formed is insoluble but the polybutene formed is soluble, separating solid polypropylene from the solution of polybutene thereby obtaining a solution of polybutene from which solid polybutene can be separated, said polybutene having a lower catalyst residue level than polybutene produced at the same catalyst level without the preliminary propylene polymerization, and separating said solid polypropylene from said solution of polybutene.

5. In a solution polymerization process in which 1-butene is polymerized in the presence of a catalyst comprising a mixture of a salt of a metal of Groups IV, V, VI, and VIII and an organo compound of a metal of Groups I, II, and III, the improvement comprising conducting, prior to the polymerization of said 1-butene, polymerization of propylene in the presence of the catalyst to be used for the polymerization of said 1-butene, said propylene forming a polymer which is insoluble in the diluent being used at the temperature of the solution polymerization of said 1-butene, the polymerization of said propylene being carried out at a temperature at which the polymer of said propylene is insoluble in the diluent and the polymerization of said 1-butene being carried out at a temperature at which said polymer of said propylene is insoluble and said polymer of said 1-butene is soluble in the diluent, and separating said insoluble polypropylene from the solution of the poly-1-butene.

References Cited by the Examiner
UNITED STATES PATENTS 2,956,994 10/1960 Peterlein _____ 260—94.9
2,967,834 1/1961 Daniel et al. _____ 260—94.9

JOSEPH L. SCHOFER, *Primary Examiner.*

FRED L. DENSON, *Assistant Examiner.*